H. M. GROOMES.
DISAPPEARING VEHICLE TOP.
APPLICATION FILED APR. 6, 1917.

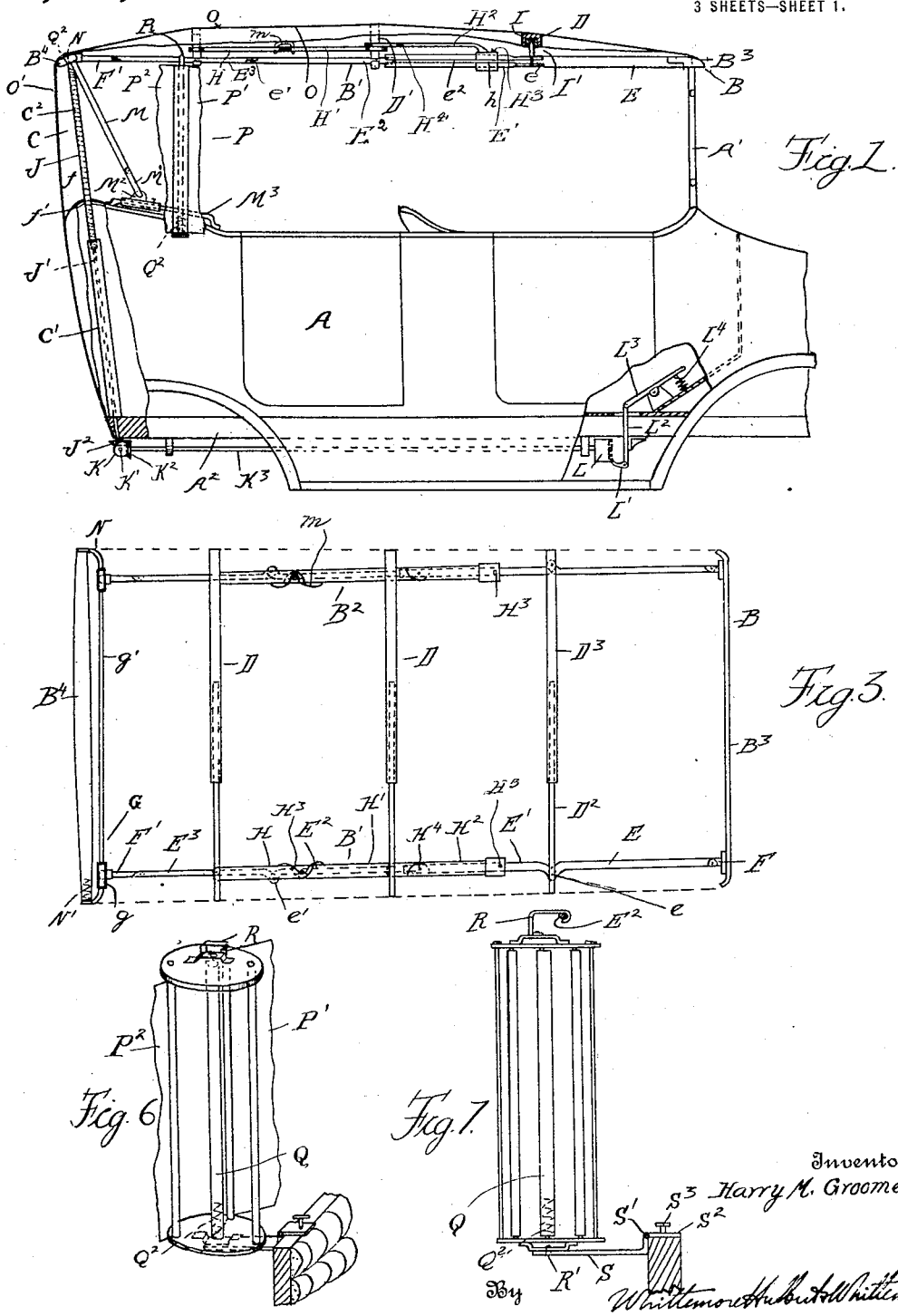

1,333,844.

Patented Mar. 16, 1920.
3 SHEETS—SHEET 2.

Inventor
Harry M. Groomes

By Whittemore Hulbert & Whittemore

Attorneys

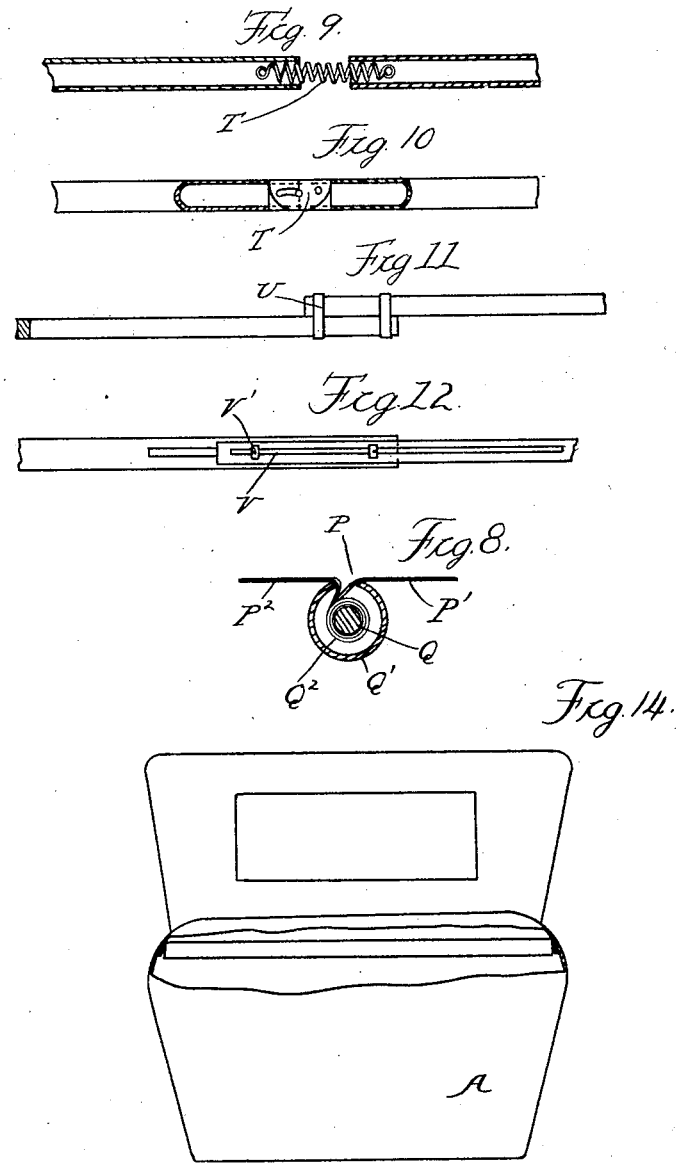

UNITED STATES PATENT OFFICE.

HARRY M. GROOMES, OF DETROIT, MICHIGAN.

DISAPPEARING VEHICLE-TOP.

1,333,844.    Specification of Letters Patent.    Patented Mar. 16, 1920.

Application filed April 6, 1917. Serial No. 160,143.

*To all whom it may concern:*

Be it known that I, HARRY M. GROOMES, a citizen of the United States of America, residing at Detroit, in the county of Wayne and State of Michigan, have invented certain new and useful Improvements in Disappearing Vehicle-Tops, of which the following is a specification, reference being had therein to the accompanying drawings.

The invention relates to a disappearing vehicle top adapted particularly for automobiles and it is the object of the invention to obtain a construction which is collapsible laterally and vertically to disappear within the body of the vehicle. Another object is to obtain a construction in which the top may be readily laterally extended and collapsed, the construction of the frame of the top being such that the movement of the cross bows is dependent thereon. Still another object is to obtain a construction in which provision is made for raising the top from a seat in the vehicle. A further object of the invention is to obtain a construction in which rollers are provided for the different curtains for the top. Other objects of the invention will more fully hereinafter appear.

In the drawings:

Figure 1 is a side elevation with parts broken away of the construction embodying my invention;

Figs. 3, 4 and 5 are plan views of the top frame when in extended position, when partially collapsed and when entirely collapsed respectively;

Figs. 6 and 7 represent the roller structures and their manner of attachment to the vehicle body and top;

Fig. 8 is a fragmentary sectional view of the side curtain with its roller construction;

Figure 13:
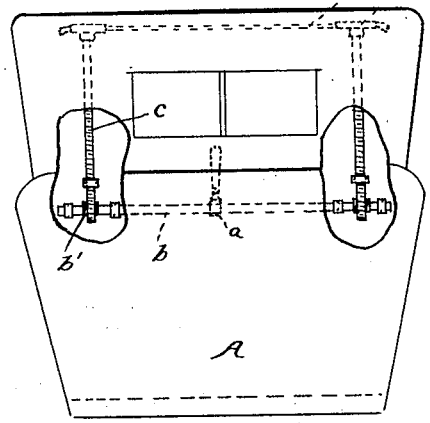

Figs. 9, 10, 11, and 12 represent different constructions of side bars for the top frame;

Fig. 13 is a rear elevation with parts broken away of a modified construction, showing a modified means for raising and lowering the top; and Fig. 14 is a rear elevation with parts broken away showing a modified arrangement of curtain roller.

A represents the body of the vehicle provided with a windshield A', and B represents the frame of the top adapted to be supported at its forward end upon the windshield A' and at its rearward end upon the supports C.

The frame B comprises the side bars B' and $B^2$, the front cross bow $B^3$, the rear cross bow $B^4$, which latter is preferably a roller, and the series of intermediate cross bows D provided with the downwardly extending portions D' slidably engaging and mounted upon the side bars. As shown the series of intermediate cross bows comprise telescopic sections $D^2$ and $D^3$ to permit of the sliding of the same longitudinally upon the side bars when the latter converge toward the front end of the frame; but it is evident that where the side bars are parallel bows may be used having no telescopic sections.

Each side bar comprises the series of rods E, E', $E^2$ and $E^3$ of substantially equal length, the rods E and E' being hinged to each other as at $e$ and the rods $E^2$ and $E^3$ being hinged to each other as at $e'$, the arrangement of the hinges being such that the rods may swing laterally inward. The rods E and E' are of slightly larger diameter than the rods $E^2$ and $E^3$ to permit of the telescopic engagement thereof and the rod E' is slotted at $e^2$ to permit of the passage of the hinge $e'$ in telescoping. The rod E at its forward end is pivotally connected to the support F for the front cross bow $B^3$ which support engages and rests upon the frame of the windshield A'. The rod $E^3$ at its rearward end is pivotally connected to the laterally extending rod F' secured to the top frame base member G, which preferably comprises the four-way T's $g$ connected by the horizontal rod $g'$. In both instances the pivotal connection is such that the rods may swing inward laterally but are prevented from swinging outward beyond their positions of alinement.

To permit of sliding the bows longitudinally rearward upon the side bars to engage the laterally extending rods F' the downwardly extending portions D' are provided with lateral slots to permit of the passage of the hinge $e'$.

For the purpose of moving the series of intermediate bows D into their proper positions both when the frame is being extended and collapsed there are provided the rods H and H' pivotally connected to each other and to the rear and center bows of the series and the rod $H^2$ non-rotatively connected to the center bow and engaging the rod E' locked thereto at its opposite end by the set screw H³. The portion of the rod H² engaging the rod E is provided with the lateral slot h for the passage of the hinge e'. The spring m is provided normally tending to swing the rods H and H' outward upon their common pivot.

Figure 4:
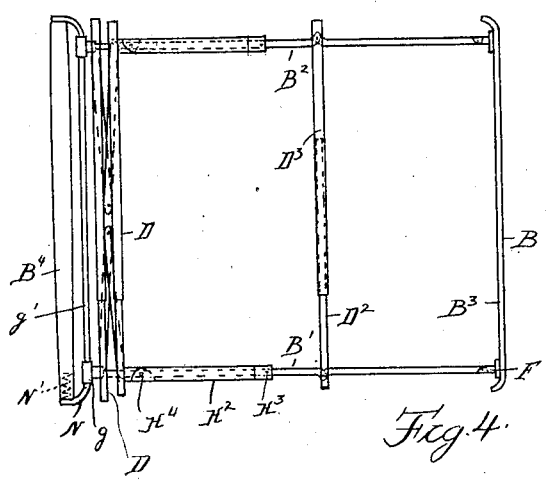
Figure 2:
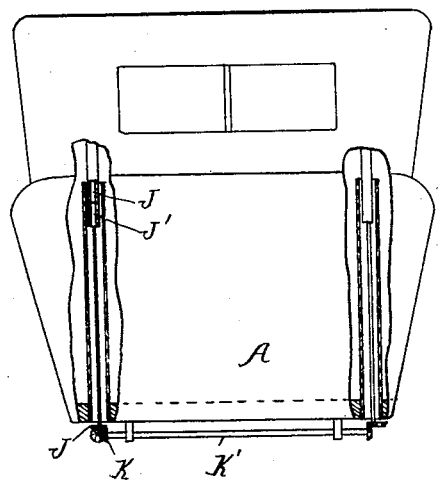
Fig. 2 is a rear elevation thereof with parts broken away.

As thus far described it may readily be seen that with the frame in extended position as shown in Fig. 3 the same may be collapsed by removing the supports F from the frame of the wind-shield A' and by pushing rearwardly upon the forward cross bow B³ to telescope the pair of rods E and E' upon the pair of rods E² and E³ until the pivots of the hinges e and e' are in substantial alinement. During this operation the rear and center cross bows of the series D are moved rearwardly through their connections H, H' and H² to engage the rods F'. The connection H² is hinged at H⁴ to swing in only one direction, the distance between the center cross bow and hinge H⁴ being such that when the cross bows are mounted upon the rods F' as shown in Fig. 4 the hinge H⁴ is in substantial alinement with the pivotal connection between the rod E³ and the rod F'.

Figure 5:
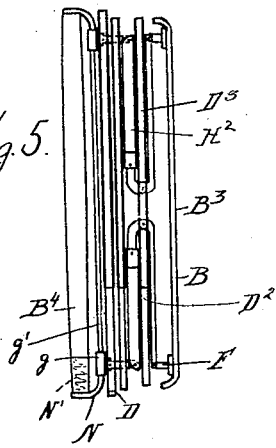

The next operation consists in swinging inward the hinges e and e', sliding the members I' connected to the hinges e in the groove I of the front bow of the series D, Fig. 5 representing the positions of the parts at the end of this operation.

Sufficient space between the back of the body and the back of the rear seat of the vehicle is provided for receiving the top frame when entirely collapsed. For covering this space in the vehicle body the cover f preferably of the same leather as the upholstery of the vehicle is used, this cover being secured to a wire frame f' to maintain its correct shape.

For raising and lowering the top means is provided which may be operated either by hand or foot. As shown in Fig. 1 the supports C are formed of the telescopic members C' and C², the members C' being mounted upon the frame A² of the vehicle body A and the members C² having rigidly secured at their upper ends the four-way T's G. The telescopic members C² are provided with internal threads J adapted to engage the threaded ends of the rods J' within the rods C'. The rods J' at their lower ends and beneath the body of the vehicle are provided with the bevel gears J² which are engaged by the bevel gears K upon the horizontal shaft K'. For rotating this shaft the bevel gear K² is provided meshing with the bevel gear K', the bevel gear K² being upon one end of the shaft K³, the opposite end thereof having the gear L mounted thereon, the latter being provided with teeth on its end engageable by the dog L' which in turn is pivoted to the link L², the arrangement being such that the dogs engage the teeth on the upward stroke and slide thereover on the downward stroke. The link L² is pivoted to the foot lever L³ pivotally mounted on the foot boards of the vehicle and yieldably held in operative position by the spring L⁴. The pivotal mounting for the foot lever comprises a horizontal rod extending transversely of the body over which the foot lever is longitudinally slidable for the purpose of positioning the dog L' to engage the teeth upon either side of the center of the gear L to rotate the same in either direction, thereby either raising or lowering the top.

As shown in Fig. 13 the means for raising and lowering the top comprises the ratchet a engaging the horizontal shaft b mounted in the frame of the body A. Keyed to the shaft are the pinions b' for engaging the serrated portions of the vertically extending rods c forming the supports for the top frame and engaging the top frame base member G. The ratchet a is preferably provided with a pivoted handle to permit of swinging the same below the top of the body when not in use.

The links M and M' are further provided for supporting the frame of the top, they being pivoted to each other to allow the breaking of the joint in only the rearward direction and the link M being pivotally connected to the frame base G and the link M' being pivotally connected to the slide M² upon the guide bar M³ and adapted to be secured thereto as by a set screw, the guide bar being mounted upon the body A.

The cross bow or roller B⁴ is mounted upon the brackets N which are secured to the base member G and extend to the rear of the side bars B' and B² and outwardly and downwardly so that the roller extends outwardly beyond the side bars to permit of having the top and back curtains sufficiently wide for the bodies of the vehicles in which the sides converge toward the front and is located in a plane lower than that passing through the series of intermediate cross bows D in order to secure the downwardly extending portions or side decks of the top curtain.

As shown in Fig. 14 the cross bow or roller may be mounted in the space partly taken up by the top frame when entirely collapsed in the rear of the vehicle body, in which case the back and top curtains are continuous.

The top curtain O and the back curtain O' are suitably connected to each other, as by a flap (not shown) which is secured to the roller B⁴ provided with the spring N' therewithin arranged to continuously exert a pull on the flap to roll up the curtains O and O'. To fasten the curtains O and O' in extended position they are secured respectively to the front bow B³ and to the rear of the body A by suitable means such as snap buttons. The side curtains P comprise the forward and rearward portions P' and P² adapted to be rolled on the roller Q. As shown particularly in Fig. 8 the forward and rearward portions P' and P² are connected to each other by a common flap which is secured to the roller Q. Before permitting the spring within the roller to rotate the same the free end of the portion P² is secured to the portion P' and then both portions are permitted to roll together. Also as shown the roller Q is inclosed within the casing Q', sufficient space being therebetween for the forward and rearward portions of the side curtain. Fig. 6 shows the use of a plurality of rods instead of the casing Q' and also the rearward portion P² as secured at its one edge to one of these rods, the forward portion P' being secured at one edge to the roller Q. With this construction the forward portion P' is first permitted to roll and then is held from further rotation by suitable means (not shown) and the rearward portion P² is unfastened at its rear edge when the spring Q² will produce a rotation in the reverse direction whereby the rearward portion is wound upon the rods. Fig. 7 shows a construction having the additional feature of guide rollers for the portions of the curtain.

For the purpose of providing a side curtain construction which will disappear with the top the roller Q is provided at its upper end with the hook R slidably engaging the lever E³ and at its lower end with the pivot R' engaging the bracket S hingedly secured at S' to the plate S² adapted to be secured to the body A by a thumb screw S³.

Figs. 9, 10, 11 and 12 show modifications of the side bars B' and B² in which Fig. 9 discloses the coil spring T suitably secured to different rods and adapted to be bent so that said rods occupy parallel positions. Fig. 10 represents the two rods pivotally connected to an intermediate member T' having a lost motion connection with one pivot for the purpose of providing for a strong substantial connection when the rods abut and sufficient movement to allow the rods to lie in parallel positions. In Fig. 11 the rods are slidably connected to each other by bands U while in Fig. 12 the rods are correspondingly slotted at V and provided with pivotal clamping members V' extending through the slots to hold the rods in engagement.

What I claim as my invention is:

1. In a vehicle, a top frame, comprising a base member having laterally extending rods secured thereto, collapsible side bars pivoted to said rods and in alinement therewith when in extended position, cross bows longitudinally slidably engaging said bars, and connections between said cross bows and bars for moving said cross bows longitudinally off said bars to said laterally extending rods upon the collapsing movement of the former.

2. In a vehicle, the combination with a body and a rod mounted thereon, of a laterally collapsible top frame and a vertically collapsible support for said frame, and a brace connected to said frame and slidably engaging said rod.

3. In a vehicle, the combination with a body and a rod mounted thereon, of a laterally collapsible top frame and a vertically collapsible support for said frame, a rod pivotally connected to said support, a second rod pivoted at one end to said rod to swing in one direction, and a member pivotally connected to said second rod at its opposite end and slidably engaging said rod mounted on the vehicle body.

4. In a top frame, collapsible side bars, each comprising a plurality of telescoping pairs of hinged rods, said pairs of rods adapted to telescope each other to permit of the alinement of the pivots of the hinges, whereby said pairs of rods may be simultaneously swung upon their hinges.

5. In a vehicle, the combination with the vehicle body having a recess therein, of a top frame, and a support therefor, said top frame comprising side bars and a cross bow extending therebetween and slidably engageable therewith, said cross bow adapted to engage said support and said side bars adapted to be swung laterally into juxtaposition to said cross bow when engaging said support, said support with said crossbows and side-bars in juxtaposition to each other being movable into the recess in said vehicle body.

6. In a vehicle, a body and a laterally collapsible top therefor, including collapsible side bars, and rollers, said rollers arranged substantially vertically between said side bars and body when the top is in extended position and connected to said side bars to permit of lying within said top when in collapsed position.

7. In a vehicle, a top frame, comprising a member having laterally extending rods, laterally swinging telescopic side-bars pivoted to said laterally extending rods, and a cross-bow slidably engaging said side-bars and slidably engageable with said laterally extending rods.

8. In a vehicle, a top frame, comprising a member, collapsible side-bars upon said member, cross bows extending across said side-bars, and means for moving said cross bows from said side-bars to said member upon movement of said side bars.

In testimony whereof I affix my signature.

HARRY M. GROOMES.